Patented July 10, 1945

2,379,889

UNITED STATES PATENT OFFICE 2,379,889

ETHERIFICATION OF LIGNINS AND LIGNINLIKE MATERIAL

Rodger M. Dorland and Robert M. Boehm, Laurel, Miss., assignors to Masonite Corporation, Laurel, Miss., a corporation of Delaware No Drawing. Application June 20, 1942,
Serial No. 447,869

22 Claims. (Cl. 106—163)

This invention relates to a ligno-cellulose composition and to the process of preparing the same, said composition having excellent molding properties and improved physical and chemical characteristics as contrasted to previously known ligno-cellulose materials. It relates especially to a process whereby the hydrogen of selected hydroxyl groups of the lignin and lignin-like components is replaced by radicals, as methyl, ethyl, benzyl, etc., to form ethers and produce a material of improved properties which is stable and not readily attacked by alkali, and has improved plasticity, heat resistance and water resistance over similar products prepared by previously known methods. The selective etherification reaction of the lignin and lignin-like fractions is accomplished under controlled and mild conditions and it is unnecessary to separate the cellulose from the fractions since the proper groups of the lignin and lignin-like fractions may be selectively etherified in the presence of the cellulose.

While the invention may be carried out with various lignin-containing materials, it is preferable to first subject ligno-cellulose wood or woody materials, such as wood of trees and the wood fiber portions of annual products such as cornstalks, sugar cane, and the like, to hydrolysis.

This hydrolysis treatment of ligno-cellulose material serves to substantially convert hemicelluloses present to soluble or dispersed state so that they may be removed as by washing. A small proportion of acids, such as formic and acetic acid is produced. These too may be removed by various procedures. The hydrolysis also appears to bring about some depolymerization of lignins, and to effect some degree of separation or breaking down of linkages between lignins and cellulose, or at least to make the lignin more responsive to selective reactions and treatments.

Boards and molded products made from such hydrolyzed and washed material are readily attacked by alkali. We attribute this to the presence of hydroxyl groups of lignin and depolymers of lignin, especially reactive phenolic hydroxyl groups which, in carrying out the present invention, are covered up, or in other words have the hydrogen thereof replaced by stable radicals, in order to get high resistance to attack by alkali. While alcoholic hydroxyl groups of the lignin constituents are present, they are apparently not so readily reacted as to be a material factor in the attack by alkali.

It is an object of the invention to provide a process whereby the lignin-containing material is so treated that the products made therefrom are highly resistant to alkali.

Another object of the invention consists in providing a process whereby the ready reaction of lignin and depolymers thereof with alkali is utilized in bringing about a non-reversible etherification reaction which is productive of high alkali resistance, improved plasticity, and high heat and water resistance in the final product.

A further object consists in carrying out the reactions with the lignin components in the presence of the cellulose components of subdivided and preferably hydrolyzed wood or other ligno-cellulose material in such manner that after the lignin or part thereof has been converted to a substantially water-soluble state by the addition of alkali, it is reacted with ether-forming materials and the resulting resinous material formed in situ, thus providing a resinous bonding material ideally situated with respect to the cellulose for effectively performing a bonding function in the manufacture of boards, molded products, and the like.

According to a preferred embodiment of the invention, the lignin-containing material, after being hydrolyzed and washed, and in subdivided state, as fiber, or ground to powder, is subjected to treatment with dilute bases, as sodium hydroxide, for example, the materials preferably being heated and stirred together. Other bases may be employed, as for example, potassium hydroxide and other alkali metal and ammonium hydroxides. Carbonates of the alkali metals and ammonium carbonate may also be used. Also, organic compounds which have a basic reaction may be used. Examples of such compounds are quinoline, pyridine, ethanolamine, triethylamine, tetramethylamine, and the like. As a general rule, due to the weaker alkaline reaction, larger quantities of organic bases must be used as compared to the quantity of inorganic basic material, and thus for the benefit of economy and availability inorganic basic materials such as sodium hydroxide are preferred. The treatment with the base is mild, and is controlled for the purpose of effecting reaction with the lignin and its depolymers and converting them or at least a large part thereof into a substantially water-soluble state, without being so drastic as to cause much if any attack on the cellulose, or to produce such breaking down of the lignin as to bring about production of new reactive hydroxyl groups. The hemi-celluloses having been principally removed, there is little or no reaction of the basic material on hemi-cellulose.

Without commitment to particular theory, it appears that the solubility so obtained is a result of replacement of the hydrogen of lignin hydroxyl groups, especially phenolic hydroxyl groups which are more reactive, as for example with sodium to form sodium lignate, with water as a by-product.

The etherifying agent may be added to the lignin containing material at any time prior to the heat treatment, as for example, the addition may be made at the time the base is added to the mixture. While the etherifying agent may be added earlier if desired, its addition is preferably made and reaction therewith carried out after the treatment with the base, and as a separate step. This can be done by merely adding the etherifying agent to the bath, usually with continued heating and stirring. The reaction may be carried on by following various procedures, as for example, heating the mixture until the desired etherification is obtained. If care must be taken to prevent loss of volatiles, the reaction may be carried on under heating and refluxing conditions. Another satisfactory method is mixing the lignin containing material, base and etherifying agent, and then heating the mixture under pressure until the desired degree of etherification has occurred.

Useful etherifying agents include alkyl halides, such as methyl chloride, ethyl chloride, ethyl iodide, allyl chloride, dichlorethyl ether, and the like, aralkyl halides such as, for example, benzyl chloride and chloromethyl-naphthalene, alkyl sulfates such as dimethyl sulfate, diethyl sulfate, and the like, and aryl compounds such as 3,5-dinitro-chlorobenzene. It is usually desirable to provide some slight excess of etherifying material to ensure getting as thorough etherification as practicable in a single-step etherification treatment.

When the stoichiometric quantity of etherifying agent is used, the reaction will normally progress to substantial neutrality. In case of some excess supply of etherifying agent, the resulting pH will ordinarily be lower, and such acidity is apparently brought about by some formation of acid, as hydrochloric acid, for example, after the alkali has been exhausted.

After the etherification treatment, the solids when washed for removal of salts produced and of any excess reagent, and rendered substantially dry, are ready for molding, or they may be formed from water into laps for board-making, etc.

The etherifying reaction which is effected is believed to consist in the replacement of the sodium (or other alkali metal, or ammonium or other basic radical) of the sodium lignate by the methyl, ethyl or other ether-forming radical, with the formation of sodium halide, sulfate, etc. as a byproduct.

There are several indications that such is the route of reaction. One such indication is that with use of, say methyl chloride as the etherifying agent, sodium chloride is formed, and the pH of the bath is lowered as the reaction continues. Another indication to the same effect is that when dimethyl sulfate is used, for example, the methoxyl content of the resulting solids (already fairly considerable in the lignins, depolymers thereof and the like) is increased by such treatment. That the overall effect of the etherifying reaction serves to replace the hydrogen of the hydroxyl groups at least in part by stably bonded radicals appears from the fact that the reaction is not reversible, that is to say, after the materials have been reacted in the manner described, the product is highly resistant to attack by alkali and has improved plasticity, heat resistance and water resistance.

The etherified lignins will precipitate from the alkaline solution and are generally in the form of a fine suspension as long as the solution is quite alkaline but when the pH of the solution decreases or approaches neutrality or becomes acid, the finely divided precipitate tends to agglomerate or coagulate and settle. In order to utilize the etherified lignins in operation, it is preferable that the product be substantially coagulated in order to make handling of the etherified product more practical.

One way in which the invention may be utilized to advantage is for the treatment of wood which has been hydrolyzed by exposure to high steam pressure in the Mason gun (e. g., U. S. Patent 1,824,221). As described in U. S. patent to Mason, Boehm & Koonce, No. 2,080,078, predominantly plastic material may be produced by relatively long-continued exposure to a steam pressure of about 300 to 1000 pounds per square inch, and the material reduced to fineness by explosion ensuing upon the opening of an outlet from the region of high steam pressure to a region of lower pressure such as atmospheric. Hardwoods such as gumwood are particularly well adapted for preparation of a predominantly plastic material in this way upon washing for removal of the water-solubles produced principally from the hemi-celluloses by such hydrolysis treatment. When such material is subjected to the etherification treatment of the present invention it is not only made highly resistant to alkalies, but its plasticity, heat resistance and water resistance are markedly improved.

Other methods of hydrolysis may be utilized in the present invention, as for example cooking the natural ligno-cellulose material with water or with added materials, within a temperature range of about 150° C. to 200° C. and for about 3 hours to render water-soluble a part of the ligno-cellulose material and especially substantially dissolve the hemi-celluloses. After thus treating the materials, the water-soluble components such as the hydrolyzed hemi-celluloses are removed by washing or the like to prepare the lignins for the subsequent etherification treatment.

While other modes of hydrolysis and reducing to fineness may be used, the starting material used in the five following examples consisted of gumwood which had been exposed to approximately 600# steam pressure in a gun for about 45 seconds (or slightly longer when chips containing over 30% of water were used), and disintegrated to fiber by explosion, and washed for removal of solubles, the stated exposure to steam in the gun being sufficient to convert the material into a predominantly plastic state as described in said U. S. Patent No. 2,080,078.

Material prepared as above described is referred to in the following examples as "stock." Except where otherwise stated, the apparatus used in the examples consisted of a closed vessel, equipped with stirrer and reflux condenser. In each example, after completion of the reaction, the material was filtered and then thoroughly washed with water, and moisture content adjusted to approximately 4%.

*Example 1.*—To 100 grams of ground air dry stock were added 10 grams of sodium hydroxide and 1500 grams of water. The mixture was stirred at a temperature of 40° C. for a period of 10 minutes, after which the temperature was raised to 60° C. and 31.7 grams of dimethyl sulfate added. The etherification of the lignin was carried on at this temperature while stirring and refluxing the mixture for a period of one hour. The pH at the end of this time was approximately 3.

*Example 2.*—To 100 grams of ground air dry stock were added 10 grams of sodium hydroxide and 2000 grams of water. The mixture was stirred at a temperature of 45° C. for a period of 10 minutes, after which the temperature was raised to 65° C. and 60 grams of ethyl iodide was added. The etherifying treatment of the lignins was carried on at this temperature while stirring and refluxing the mixture for a period of 6¾ hours. The pH at the end of this time was approximately 8.

*Example 3.*—To 100 grams of ground air dry stock were added 14 grams of potassium hydroxide and 2000 grams of water. The mixture was stirred at a temperature of 45° C. for a period of 10 minutes. After thus mixing the materials 35 grams of ethyl iodide were added and stirring and refluxing was continued at a temperature of 45° C. to promote the etherification of the lignins. The refluxing operations continued for a period of 7 hours. The pH at the end of this time was approximately 8.

*Example 4.*—In a pressure vessel or autoclave, 200 grams of ground air dry stock was treated with 40 grams of sodium hydroxide, 100 grams dichloroethyl ether and 1200–1300 grams of water at a temperature of 150° C. The etherification treatment of the lignins was continued for a period of 2 minutes after reaching the above temperature. The pH at the end of this time was approximately 6.4.

*Example 5.*—In a pressure vessel or autoclave, 100 grams of ground air dry stock was mixed with 20 grams of sodium hydroxide, 40 grams of allyl chloride and 1200–1300 grams of water. The temperature of the mixture in the autoclave was raised to 150° C. and the etherification treatment of the lignins was continued for 15 minutes. The pH at the end of this time was approximately 4.5.

The materials in the above five examples, in which the lignins have been subjected to the etherification treatment, were shaped, the moisture content adjusted to about 4%, and pressed at about 1500 pounds per square inch at 180° C. for 10 minutes, and the press platens were cooled under pressure before opening. Another sample of stock, referred to as blank A, without being subjected to etherification treatment, was similarly prepared. The physical properties of the several examples and blank A are as follows:

will attack the cellulose with deleterious effect on the strength of the final product made from the fiber. By buffering such acids, as formed, in the manner above described, this attack is reduced or avoided, leaving the cellulose in good condition as a filler to impart strength to the final product. Such impregnation and buffering per se is not included within the present invention, being described and claimed in application of W. H. Mason and R. M. Boehm, Ser. No. 264,980. The ligno-cellulose material which was treated in the gun with the buffering material was washed to remove the water solubles. Materials thus prepared will be referred to in samples 6, 7 and 8 as "buffered stock."

The following are examples of utilization of the present invention on material buffered in this manner.

*Example 6.*—To 125 grams of buffered stock material, 12.5 grams of sodium hydroxide was added and the mixture thoroughly stirred with 1000 grams of water for 10 minutes at a temperature of about 45° C. The temperature was then raised to about 65° C. and 39 grams of dimethyl sulfate was added. The stirring and refluxing was continued for a period of about one hour to promote the etherification of the lignin, after which the pH of the solution was approximately 6.

*Example 7.*—To 150 grams of buffered stock 21 grams of potassium hydroxide was added and the mixture stirred thoroughly with 1100 grams of water for a period of 10 minutes at a temperature of about 45° C. The mixing and refluxing was continued and the temperature was raised to about 65° C., and 57 grams of di-ethyl sulfate was added. The etherification treatment of the lignins was continued for a period of one-half hour, and the pH of the mixture at the end of the treatment was approximately 3.8.

*Example 8.*—To 100 grams of buffered stock was added 10 grams of sodium hydroxide and the mixture thoroughly stirred with 1000 grams of water for a period of about 10 minutes at a temperature of about 45° C. The temperature was then raised to 78° C., and 31.4 grams benzyl chloride was added. The etherification treatment of the lignins was continued for a period

*Table 1*

| | Percent methoxyl | Sp. gr. | Modulus of rupture, #/sq. in. | Rockwell hardness, M scale | Percent uptake in 24 hours | | Blistering temp., °C. |
|---|---|---|---|---|---|---|---|
| | | | | | (H₂O) | (1% NaOH) | |
| Blank A | 7.75 | 1.43 | 6,500 | 93 | 2.0 | 53.0 | 135 |
| Example #1 | 9.85 | 1.43 | 6,240 | 93 | 1.7 | 8.9 | 145 |
| Example #2 | ¹ 10.35 | 1.41 | 8,010 | 84 | 1.7 | 3.9 | 152 |
| Example #3 | ¹ 10.04 | 1.41 | 9,140 | 95 | 1.8 | 5.5 | 173 |
| Example #4 | (²) | 1.44 | 8,760 | 89 | 1.4 | 3.0 | 200 |
| Example #5 | (²) | 1.41 | 7,915 | 96 | 1.1 | 6.7 | 137 |

¹ Total determined alkoxyl calculated to methoxyl.
² No determination made.

To secure products having greater impact strength, it is of advantage to introduce a buffering or buffer-forming agent into the wood chips or other ligno-cellulose material supplied to the gun, as by impregnation of these chips with a small proportion as 5% of sodium carbonate, for example. Without such provision, the hydrolysis which is performed in the gun is accompanied by production of acids, as acetic acid. In the absence of such buffering material these acids of about 2 hours and the final pH was approximately 4.

The materials of Examples 6, 7 and 8 were then filtered, washed and subjected to a drying action. The materials each containing approximately 4% of H₂O were pressed at about 1500 pounds per square inch pressure at a temperature of about 180° C. for 10 minutes, and the press platens were cooled under pressure before opening. The physical properties of the three preceding examples (6, 7 and 8) made on the several buffered materials are given in the following table and compared to a similarly pressed material from the same stock, but which has not been subjected to etherification treatment, designated "blank B."

drolyzed wood chips containing only such lignins as are normally obtained from wood. It has been found, however, that the characteristics of the final etherified product may be varied over a wide range by changing the lignin content of the products subjected to the etherification treat- Table 2

| | Percent methoxyl | Sp. gr. | Modulus of rupture, #/sq. in. | Rockwell hardness, M-scale | Percent uptake in 24 hours | | Blistering temp., °C. |
|---|---|---|---|---|---|---|---|
| | | | | | (H₂O) | (1% NaOH) | |
| Blank B | 7.4 | 1.43 | 11,000 | 98 | 2.4 | 70.0 | 143 |
| Example #6 | 9.07 | 1.41 | 15,750 | 100 | 2.5 | 10.6 | 155 |
| Example #7 | ¹ 8.88 | 1.42 | 14,750 | 98 | 2.0 | 10.1 | 175 |
| Example #8 | (²) | 1.42 | 13,300 | 98 | 0.6 | 2.7 | 150 |

¹ Total determined alkoxyl calculated to methoxyl.
² No determination made.

In all the preceding examples the stock material used as a raw material has been primarily in a ground state. If, however, fiber stock is used, the physical characteristics, as will be hereinafter shown, will be materially better. In the production of sheet material, ordinarily referred to as wet lap, fiber stock is used and the following example illustrates the superior physical properties obtained through the use of the etherification treatment of the lignins in the fibrous hydrolyzed ligno-cellulose stock.

*Example 9.*—In preparing the material, 550 grams of unground hydrolyzed buffered stock was mixed with 4½ gallons of water and 30 grams of sodium hydroxide. The materials were thoroughly mixed at room temperature after which the temperature of the mixture was raised to 50° C. and 91 grams of benzyl chloride was added. Following the addition of the etherification agent the temperature was raised to about 77° C. and the mixture was refluxed and stirred for a period of about 2½ hours. After the etherification treatment of the lignins had been carried out to the desired degree, the pH of the solution was 7. The temperature of the mixture was then raised to about 100° C. and 300 cc. of distillate was removed in order to insure substantially complete removal of any remaining benzyl chloride. The material was then filtered, washed, and formed into a wet lap in the usual manner and subjected to a drying action to remove the greater proportion of water. After the drying action the water content of the sheet was about 3%. The material was then subjected to a pressing action of about 2000 pounds per square inch at a temperature of 180° C. and the press was cooled before opening.

Another sample of material was prepared by following the same procedure as the treatment applied to the unground hydrolyzed stock but without subjecting the stock to any etherification reaction. This material will be referred to in the following table as "blank C."

ment. This may be accomplished by adding hydrolyzed lignins to the hydrolyzed ligno-cellulose mixture and then etherifying the resulting mixture in the same manner as described above. It has also been found practical to add etherified lignins to etherified ligno-cellulose mixtures. It has further been found practical to add etherified lignins to hydrolyzed ligno-cellulose material to obtain suitable molding compositions. By varying the amount of etherified lignin present in the mixture, the physical and chemical characteristics may be readily controlled, particularly the plasticity and flow of the final etherified molding compound. In view of the ability to control the characteristics of the final product, the novel product may be broadly used in the molding industry.

Within the scope of the present invention our etherification treatment may be applied not only to lignins obtained from wood and woody materials as described above, but also to lignins obtained from waste sulfite liquors, soda liquors, etc., and also to various materials having properties similar to lignins, as for example tannins, phlobaphenes, lignin-like materials containing phenolic hydroxyls, etc., and as a generic expression to include lignin and such other material having lignin-like properties, we have made use of the generic expression "ligninous material" in certain of our claims.

The invention has many advantages: The entire treatment is simple and direct, consisting in its simplest embodiment of reacting in a water bath with alkali and continuing the reaction with the etherifying agent added to the bath together with a final washing step made easier by the presence of water throughout the reactions. The cellulose of the fibers may be left comparatively long and strong while the lignin, being largely put into a substantially dissolved state by alkali and then restored to solid state by the step of etherification, is thoroughly distributed throughout the cellulose. The etherified resinous mate- Table 3

| | Sp. gr. | Modulus of rupture, #/sq. in. | Rockwell hardness M-scale | Per cent uptake in 24 hours | | Impact ft. lbs./sq. in. | Modulus of elasticity, #/sq. in. |
|---|---|---|---|---|---|---|---|
| | | | | (H₂O) | (1% NaOH) | | |
| Blank C | 1.42 | 19,200 | 110 | 2.1 | 101.0 | .57 | 1,735,000 |
| Example #9 | 1.41 | 20,050 | 107 | 2.0 | 9.2 | .66 | 1,972,000 |

In the above described examples, the novel procedure has been described as applied to hydrolyzed rial being so distributed can serve most effectively as a bonding agent when the fiber is made use of for making boards or when cured in molds under heat and pressure.

The water solubles removed by washing or in other ways following hydrolysis can be utilized for production of valuable products, as described and claimed in patent to Boehm No. 2,224,135.

Blistering temperature, referred to in Tables 1 and 2, is the temperature at which a sample of the material, when subjected to heat without pressure, tended to expand rapidly accompanied by rupturing of the surface.

Results substantially similar to those obtained with the etherification treatment claimed herein can be secured by an esterification treatment, and same is disclosed and claimed in the companion application, Ser. No. 447,870, filed by the present applicants on even date herewith.

Since it is obvious that many changes and modifications can be made in the details above described without departing from the nature and spirit of the invention, it is to be understood that the invention is not to be limited to these details except as set forth in the appended claims.

We claim:

1. A composition of matter suitable for molding or the like into products having the characteristics of improved stability, high alkali resistance, high heat resistance and improved resistance to water absorption, which includes an etherified lignin in which substantially only the hydroxyl groups of the lignin contributing to the solubility in 1% aqueous alkali have been etherified.

2. A composition of matter suitable for molding or the like into products having the characteristics of improved stability, high alkali resistance, high heat resistance and improved resistance to water absorption, which includes an etherified ligno-cellulose material in which substantially only the hydroxyl groups of the lignin contributing to the solubility in 1% aqueous alkali have been etherified.

3. A composition of matter suitable for molding or the like into products having the characteristics of improved stability, high alkali resistance, high heat resistance and improved resistance to water absorption, which includes ligno-cellulose material in which the lignin has been etherified and etherified lignin.

4. A composition of matter suitable for molding or the like into products having the characteristics of improved stability, high alkali resistance, high heat resistance and improved resistance to water absorption, which includes a ligno-cellulose material, the lignin of the ligno-cellulose being etherified to such a degree that substantially only the hydroxyl groups contributing to the solubility of the lignin in 1% aqueous alkali have been etherified.

5. A composition of matter suitable for molding or the like into products having the characteristics of improved stability, high alkali resistance, high heat resistance and improved resistance to water absorption, which includes a ligninous material having substantially only the hydrogen of phenolic hydroxyls of a ligninous material reacted with an ether-forming compound.

6. A composition of matter suitable for molding or the like into products having the characteristics of improved stability, high alkali resistance, high heat resistance and improved resistance to water absorption, which includes an etherified ligninous material having substantially only the hydroxyl groups contributing to the solubility of the ligninous material in 1% aqueous alkali etherified.

7. Process of preparing a molding composition including an etherified lignin from ligno-cellulose material which comprises subjecting lignocellulose material to a hydrolysis treatment at elevated temperature and pressure to partially hydrolyze said material, washing the hydrolyzed material to separate water soluble hydrolyzed components including acids from the non-water soluble hydrolyzed ligno-cellulose component, treating said component with alkali, and treating the reaction product so obtained with an etherifying compound whereby to effect etherification of lignin contained in said component and to precipitate the etherified lignin in the presence of the cellulose.

8. Process of preparing an etherified ligninous composition suitable for use in molding compositions and the like, which comprises reacting a ligninous material with an etherifying compound at an elevated temperature in the presence of a base and water to form a precipitated etherified ligninous material, said base and etherifying compound being present in substantially stoichiometric relation to the acidic hydroxyl groups present in the ligninous component.

9. Process of preparing an etherified ligninous composition suitable for use in molding compositions and the like, which comprises the procedure described in claim 8, and in which the etherifying agent is an alkyl compound.

10. Process of preparing an etherified ligninous composition suitable for use in molding compositions and the like, which comprises the procedure described in claim 8, and in which the etherifying agent is an aryl compound.

11. Process of preparing an etherified ligninous composition suitable for use in molding compositions and the like, which comprises reacting a ligninous material with an etherifying compound at an elevated temperature in the presence of a base and water to form a precipitated etherified ligninous material, in which substantially only the hydroxyl groups of the ligninous component contributing to the solubility of the ligninous component in 1% aqueous alkali have been etherified.

12. Process of preparing an etherified lignin suitable for use in molding compositions and the like, which comprises mixing a lignin-containing material with an etherifying compound, an alkali and water, reacting the lignin and etherifying compound by refluxing the mixture until the desired degree of etherification is obtained to form a precipitated etherified lignin.

13. Process as described in claim 12, in which said alkali and etherifying compound are present in quantities of substantially stoichiometric proportions.

14. Process of preparing an etherified lignin suitable for use in molding compositions and the like, which comprises mixing a lignin containing material with water and an alkali to obtain a reaction between the lignin and alkali to form an aqueous alkali lignate solution, then adding an etherifying compound to the sloution and heating the solution to react the aqueous alkali lignate and the etherifying compound to form a precipitated etherified lignin.

15. Process as described in claim 14, in which said alkali and etherifying compound are present in quantities of substantially stoichiometric proportions.

16. Process of preparing an etherified lignin suitable for use in molding compositions and the like, which comprises mixing a lignin-containing material with water and an alkali to obtain a reaction between the lignin and alkali to form an aqueous alkali lignate solution, then adding an etherifying compound, and subjecting the mixture to heat and pressure to react the aqueous alkali lignate and the etherifying compound to form a precipitated etherified lignin.

17. Process are described in claim 16, in which said alkali and etherifying compound are present in quantities of substantially stoichiometric proportions.

18. Process of preparing an etherified ligno-cellulose composition suitable for use in molding compositions and the like, which comprises reacting the lignin of partially hydrolyzed ligno-cellulose material with an etherifying compound in the presence of an alkali and water at elevated temperatures until the desired degree of etherification of the lignin is obtained, thereby preciptating the etherified components in the presence of the cellulosic material to form a molding composition, said etherifying compound and alkali being present in substantially stoichiometric quantities.

19. Process of preparing an etherified ligno-cellulose composition suitable for use in molding compositions and the like, which comprises treating a material containing partially hydrolyzed ligno-cellulose with an alkali in the presence of water to react the alkali in the presence of water to react the alkali with the lignins of the ligno-cellulose material, adding an etherifying compound to the mixture, refluxing the mixture to react the etherifying compound with the reaction product of the lignin and the alkali until the desired degree of etherification of the lignins is obtained, thereby precipitating the etherified components in the presence of the cellulose to form a molding composition.

20. Process of preparing an etherified ligno-cellulose composition suitable for use as molding compositions and the like, which comprises treating a material containing partially hydrolyzed ligno-cellulose with an alkali in the presence of water to react the alkali with the lignin of the ligno-cellulose material, adding an etherifying compound to the mixture, subjecting the mixture to heat and pressure to react the etherifying compound with the reaction product of the lignin and alkali until the desired degree of etherification is obtained and to precipitate the etherified components in the presence of the cellulose to form a molding composition.

21. Process of preparing a molding composition including etherified ligno-cellulose material and etherified lignins, which comprises treating a material containing partially hydrolyzed ligno-cellulose with an alkali, an etherifying compound and water at elevated temperatures to obtain a reaction product of the lignin of the ligno-cellulose material and the etherifying compound and to precipitate the etherified components in the presence of the cellulose, and then adding an etherified lignin to the etherified ligno-cellulose mixture to form a molding composition.

22. Process of preparing a molding composition including an etherified lignin from ligno-cellulose material which comprises subjecting ligno-cellulose material to a hydrolysis treatment at elevated temperature and pressure to partially hydrolyze said material, washing the partially hydrolyzed material to separate water soluble hydrolyzed components from the non-water soluble hydrolyzed ligno-cellulose component, treating said non-water soluble component with alkali in the presence of water to react the lignin with the alkali, adding an etherifying compound and reacting the etherifying compound with the reaction product of the lignin and alkali at elevated temperature whereby to effect the precipitation of the etherified lignin in the presence of the cellulose.

RODGER M. DORLAND.
ROBERT M. BOEHM.